United States Patent [19]

Nishiyama et al.

[11] Patent Number: 5,306,550

[45] Date of Patent: Apr. 26, 1994

[54] BIODEGRADABLE COMPOSITION AND SHAPED ARTICLE OBTAINED THEREFROM

[75] Inventors: Masashi Nishiyama, Kannonji; Jun Hosokawa, Takamatsu; Kazutoshi Yoshihara, Takamatsu; Takamasa Kubo, Takamatsu; Kunio Kanaoka, Sakaide; Kazuo Kondo, Marugame; Satoshi Maruyama; Kenji Tateishi, both of Kagawa; Akihiko Ueda, Marugame, all of Japan

[73] Assignees: Director-General of Agency of Industrial Science and Technology; Okura Industrial Co., Ltd., both of Japan

[21] Appl. No.: 721,766

[22] Filed: Jun. 28, 1991

Related U.S. Application Data

[63] Continuation-in-part of Ser. No. 718,376, Jun. 20, 1991, abandoned.

[30] Foreign Application Priority Data

Jun. 29, 1990 [JP] Japan ................ 2-170075
Mar. 18, 1991 [JP] Japan ................ 3-78584

[51] Int. Cl.⁵ ............... B32B 5/16; B32B 9/02; C08K 5/00
[52] U.S. Cl. ................... 428/288; 428/326; 428/913; 428/532; 524/13; 524/35; 524/733
[58] Field of Search ............ 428/288, 290, 326, 393, 428/913, 532; 524/13, 35, 733

[56] References Cited

U.S. PATENT DOCUMENTS

| | | | |
|---|---|---|---|
| 5,015,293 | 5/1991 | Mayer et al. | 106/162 |
| 5,114,788 | 5/1992 | Nakagawa et al. | 428/284 |
| 5,154,864 | 10/1992 | Nishiyama et al. | 264/102 |

FOREIGN PATENT DOCUMENTS 02-6689  1/1990  Japan.

*Primary Examiner*—George F. Lesmes
*Assistant Examiner*—Christopher Brown
*Attorney, Agent, or Firm*—Lorusso & Loud

[57] ABSTRACT

A biodegradable film or the like shaped article is formed from a composition including 100 parts by weight of cellulose fibers having a length of 3 mm or less and a diameter of 50 μm or less, 10-600 parts by weight of a thermoplastic resin and 2-100 parts by weight of chitosan. A mixture containing (a) an aqueous solution of an acid salt of chitosan, (b) an aqueous dispersion or solution of a thermoplastic resin and (c) fine cellulose fibers is dried and shaped to obtain such a biodegradable shaped article.

14 Claims, No Drawings

BIODEGRADABLE COMPOSITION AND SHAPED ARTICLE OBTAINED THEREFROM

CROSS REFERENCE TO RELATED APPLICATION

This application is a continuation-in-part of copending application Ser. No. 07/718,376 filed Jun. 20, 1991, now abandoned.

BACKGROUND OF THE INVENTION

This invention relates to a biodegradable composition and a shaped article formed from the composition. The present invention is also directed to a method of producing a biodegradable material.

In view of the recent increasing problems of environmental pollution, the use of biodegradable plastics which are able to be decomposed by microorganisms when left in soil is being encouraged.

Japanese Published Unexamined Patent Application (Tokkyo Kokai) No. Hei-2-6689 discloses a biodegradable composite sheet composed of cellulose and chitosan. Though this composite sheet exhibits satisfactory biodegradability, it has been found that that the sheet involves a problem when used for industrial applications. Namely, this composite material is so stiff that utilization thereof is limited to specific applications. While it is possible to impart flexibility to such a composite sheet by incorporating a plasticizer, such as glycerin, sorbitol, ethylene glycol or polyethylene glycol, thereinto, the resulting sheet is found to gradually lose the flexibility when kept in contact with water and then dried because the plasticizer dissolves into the water with time.

SUMMARY OF THE INVENTION

It is, therefore, an object of the present invention to provide a biodegradable composition suitable for forming into shaped articles.

Another object of the present invention is to provide a composition of the above-mentioned type which has good flexibility and is suited as a raw material for the production of shaped articles, especially films and sheets.

It is a further object of the present invention to provide a composition of the above-mentioned type which has improved stability to water.

It is yet a further object of the present invention to provide a shaped article having good flexibility.

It is a special object of the present invention to provide a composite sheet or film which has good heat-sealability.

In accomplishing the foregoing objects, there is provided in accordance with one aspect of the present invention a composition of matters, comprising 100 parts by weight of cellulose fibers having a length of 3 mm or less and a diameter of 50 μm or less, 10-600 parts by weight of a thermoplastic resin and 2-100 parts by weight of chitosan.

In another aspect, the present invention provides a shaped article obtained from the above composition.

In a further aspect, the present invention provides a composite film comprising a substrate film formed of a biodegradable composition comprising 100 parts by weight of cellulose fibers having a length of 3 mm or less and a diameter of 50 μm or less and 2-100 parts by weight of chitosan, and a layer provided at least one side of said substrate film and formed of a biodegradable material.

The present invention also provides a method of producing a biodegradable material, comprising the steps of:

providing (a) an aqueous solution of an acid salt of chitosan and (b) an aqueous dispersion or solution of a thermoplastic resin;

mixing cellulose fibers having a length of 3 mm or less and a diameter of 50 μm or less with said aqueous solution (a) and said aqueous dispersion or solution (b) to form a mixture; and drying said mixture.

The chitosan and the cellulose fibers in the above composition may be present in the form of a composite in which they are bonded to each other. The bonding may include chemical bonding between the amino groups of the chitosan and the carbonyl groups of the cellulose fibers.

In the present specification and appended claims, the term "shaped article" is intended to refer to powders, films, sheets, coatings, mats, plates, blocks and the like shaped bodies and composite articles using these materials.

Other objects, features and advantages of the present invention will become apparent from the detailed description of the preferred embodiments of the invention to follow.

DETAILED DESCRIPTION OF THE PREFERRED EMBODIMENTS OF THE INVENTION

The biodegradable composition according to the present invention includes cellulose fibers, chitosan and a thermoplastic resin.

Any cellulose fiber may be used for the purpose of the present invention. Examples of suitable cellulose fibers include fibers formed of cellulose, hemicellulose or lignocellulose obtained from wood, straw, cotton, jute, bamboo or bagasse and cellulose produced by bacteria. Beaten fibers with a length of 3 mm or less, preferably 1 mm or less and a diameter of 50 μm or less, preferably 30 μm or less are suitably used in the present invention.

Chitosan is a product obtained by deacetylation of chitin contained in mycelia or crust of Crustacea such as crab or lobster. The molecular weight and deacetylation degree of chitosan to be used in the present invention are not specifically limited. However, a deacetylation degree of at least 60% is desired for reasons of increased solubility.

Any thermoplastic resin may be used in the present invention, though biodegradable and/or water-insoluble one is preferred. Examples of suitable biodegradable thermoplastic resins include polyvinyl alcohols, polyurethanes obtained by reaction of a polyester polyol with a diisocyanate, polyurethanes obtained by reaction of a polyester polyol and a polyether polyol with a diisocyanate, polyethylene oxides and aliphatic polyesters. As the aliphatic polyester, poly-ε-caprolactone is especially preferably used. Examples of suitable water-insoluble thermoplastic resins include polyurethanes, polyacrylates, polyvinyl acetates, polyamides and polyesters.

The use of the above-exemplified thermoplastic resins is preferable also because they show good compatibility with cellulose fibers and chitosan. From the standpoint of biodegradability, stability to water, compatibility with both cellulose fibers and chitosan and flexibility, the use of polyurethanes obtained by reaction of a polyester polyol with a diisocyanate or reaction of a polyester polyol and a polyether polyol with a diisocyanate is particularly preferred.

The amount of the chitosan is 2-100 parts by weight, preferably 5-80 parts by weight, per 100 parts by weight of the cellulose fibers, while the amount of the thermoplastic resin is 10-600 parts by weight, preferably 20-400 parts by weight, per 100 part by weight of the cellulose fibers. An amount of the chitosan outside the above range is undesirable because the wet strength becomes low. An amount of the thermoplastic resin below 10 parts by weight is insufficient to impart desired flexibility. On the other hand, too large an amount of the thermoplastic resin causes reduction of biodegradability of the composition.

One preferred method for the preparation of a biodegradable material includes the steps of:

providing (a) an aqueous solution of an acid salt of chitosan and (b) an aqueous dispersion or solution of the above thermoplastic resin;

mixing the above-described cellulose fibers having a length of 3 mm or less and a diameter of 50 μm or less with the aqueous solution (a) and the aqueous dispersion or solution (b) to form a mixture; and drying the mixture.

By shaping the mixture into a desired form before the drying, there is obtainable a biodegradable shaped article according to the present invention. For example, by spreading the mixture on a suitable surface such as of a glass plate, a shaped article in the form of a film may be obtained.

In performing the above method, since chitosan as such is not soluble in water, it is advisable to use chitosan in the form of an acid salt, such as hydrochloride or the like inorganic acid salt or formate, acetate, lactate or the like organic acid salt.

The mixture may further contain one or more additives such as a filler and a colorant. Both organic filler such as starch and inorganic filler such as silica may be used. The drying step may be performed at room temperature or an elevated temperature of up to 200° C., preferably in the range of 50°-160° C.

In one preferred embodiment, the above composition may be used for forming a substrate of a composite film having a biodegradable thermoplastic layer formed on at least one side of the substrate. The composite film shows good heat-sealability so that it is suitably used as packaging films or as construction sheets for green houses.

The thermoplastic resin contained in the substrate is preferably is a biodegradable one such as exemplified previously. The biodegradable thermoplastic layer or layers to be provided on one or both sides of the substrate may be formed of a material selected from polyvinyl alcohols, polyurethanes obtained by reaction of a polyester polyol with a diisocyanate, polyurethanes obtained by reaction of a polyester polyol and a polyether polyol with a diisocyanate, polyethylene oxides and aliphatic polyesters. Because of the presence of the thermoplastic resin in the substrate, the biodegradable layer has good compatibility with the substrate so that tight bonding may be established therebetween.

The layer of the biodegradable thermoplastic material may be provided on the substrate by any suitable method such as by coating a solution or a melt of the biodegradable material on the substrate or by bonding a film of the biodegradable material with the substrate. The bonding may be effected by fuse-bonding or with the use of an adhesive. The thickness of the biodegradable layer is preferably 1-20 μm.

In the above composite film, if the heat sealability only is desired and the tight bonding between the substrate and the biodegradable layer is not important, then the thermoplastic resin may be removed from the constituents of the substrate.

The following examples will further illustrate the present invention.

The test methods used in the examples are as follows:
Tensile Strength:
Tensile strength is measured in accordance with ASTM D882-81.
Wet Strength:
Sample film is immersed in water at 23° C. for 24 hours. The tensile strength of the resulting film is then measured.
Stiffness:
A film stiffness tester is used for measuring the stiffness of sample film with a width of 15 mm and a thickness of 90 μm.
Stability to Water:
Sample film is immersed in water at 23° C. for 24 hours and then dried. Stability to water is evaluated in terms of weight loss which is calculated as follows:

$$\textit{Weight Loss } (\%) = (W_0 - W_1)/W_0 \times 100$$

wherein $W_0$ is the weight of the sample before immersion into water and $W_1$ is the weight of the sample after immersion.
Biodegradability:
Sample film is buried in soil contained in a polyethylene vessel. This is maintained at a temperature of 23° C. and a relative humidity of 95-100% for 3 months. The soil is then removed to observe the state of the sample.
Seal Strength:
Two sample films are heat-bonded by means of an impulse sealing device and cut into a width of 10 mm. The bonded films are drawn at a drawing speed of 300 mm/minute to measure the rupture strength required for breaking the bonding.

EXAMPLE 1

Bleached pulp from needle-leaved tree was dispersed in water and subjected to a beating treatment to obtain a dispersion containing 1% by weight of cellulose fibers with a length of 0.5 mm or less and a diameter of 0.1 μm or less. The dispersion was then mixed with quantities of an aqueous solution containing 1% by weight of an acetic acid salt of chitosan and an aqueous dispersion of polyurethane (SUPERFLEX 300 manufactured by Daiichi Kogyo Seiyaku K. K., solid content: 30% by weight) to obtain a mixture having chitosan salt and polyurethane contents of 20 parts by weight and 75 parts by weight, respectively, per 100 parts by weight of the cellulose fibers. The mixture was spread over the surface of a glass plate and dried under a hot air stream at 70° C. for 6 hours to obtain a translucent film. The biodegradability test revealed that this film was decomposed so that the original shape was completely destroyed. The film was further tested for its tensile strength, stiffness and stability to give the results shown in Table 1.

EXAMPLES 2-5

Example 1 was repeated in the same manner as described except that SUPERFLEX 300 was replaced by a forcedly-emulsified type polyurethane aqueous dispersion (SUPERFLEX E2000 manufactured by Daiichi Kogyo Seiyaku K. K., solid content: 25% by weight) in Example 2, by a polyester-type polyurethane resin emulsion (YODOSOL GC52, manufactured by Kanebo NSC. K. K., solid content: 50% by weight) in Example 3, by an acrylate copolymer latex (NACRYLIC 125-4445, manufactured by Kanebo NSC. K. K., solid content: 35% by weight) in Example 4 and by a polyvinyl acetate emulsion (solid content: 41% by weight) in Example 5. The biodegradability test revealed that each of the films thus obtained was decomposed so that the original shape was completely destroyed. The tensile strength, stiffness and stability of each of the films are shown in Table 1.

COMPARATIVE EXAMPLES 1-4

Example 1 was repeated in the same manner as described except that SUPERFLEX 300 was replaced by glycerin in Comparative Example 1, by sorbitol in Comparative Example 2, by trimethylol propane in Comparative Example 3 and polyethylene glycol (#200) in Comparative Example 4.

TABLE 1

| Example No. | Dry Tensile Strength (kg/cm$^2$) | Wet Tensile Strength (kg/cm$^2$) | Stiffness (g) | Weight Loss (%) |
|---|---|---|---|---|
| 1 | 987 | 520 | 10.4 | 5.6 |
| 2 | 1084 | 483 | 7.3 | 2.7 |
| 3 | 845 | 306 | 11.4 | 2.7 |
| 4 | 840 | 369 | 9.2 | 1.9 |
| 5 | 928 | 214 | 13.4 | 5.3 |
| Comptv. 1 | 715 | 533 | 4.4 | 35.3 |
| Comptv. 2 | 887 | 478 | 5.5 | 36.6 |
| Comptv. 3 | 837 | 467 | 8.3 | 32.2 |
| Comptv. 4 | 778 | 457 | 7.2 | 33.0 |

EXAMPLE 6-15 AND COMPARATIVE EXAMPLES 5-7

Bleached pulp from needle-leaved tree was dispersed in water and subjected to a beating treatment to obtain a dispersion containing 1% by weight of cellulose fibers with a length of 0.5 mm or less and a diameter of 0.1 μm or less. The dispersion was then mixed with quantities of an aqueous solution containing 1% by weight of an acetic acid salt of chitosan and the resin shown in Table 2 to obtain a mixture having chitosan salt and resin contents as shown in Table 2 per 100 parts by weight of the cellulose fibers. The mixture was spread over the surface of a glass plate and dried under a hot air stream at 70° C. for 6 hours to obtain translucent films. The biodegradability test revealed that each of the films was decomposed so that the original shape was completely destroyed. The films were further tested for their tensile strength, stiffness and stability to give the results shown in Table 2.

TABLE 2

| Example No. | Amount of Chitosan (part) | Resin Kind | Resin Amount (part) | Dry Tensile Strength (kg/cm$^2$) | Wet Tensile Strength (kg/cm$^2$) | Stiffness (g) | Weight Loss (%) |
|---|---|---|---|---|---|---|---|
| 6 | 20 | *1 | 25 | 1215 | 468 | 17.2 | 2.3 |
| 7 | 20 | *1 | 50 | 1138 | 533 | 13.8 | 4.5 |
| 8 | 20 | *1 | 100 | 852 | 443 | 10.9 | 5.8 |
| 9 | 20 | *1 | 150 | 575 | 330 | 7.1 | 6.9 |
| 10 | 20 | *1 | 200 | 437 | 258 | 3.6 | 5.9 |
| 11 | 20 | *2 | 100 | 892 | 422 | 12.9 | 3.0 |
| 12 | 20 | *3 | 200 | 498 | 255 | 7.4 | 2.8 |
| 13 | 20 | *4 | 75 | | | | |
| | | *5 | 75 | 654 | 225 | 12.3 | 7.7 |
| 14 | 5 | *1 | 300 | 229 | 115 | 1.5 | 7.1 |
| 15 | 50 | *3 | 100 | 593 | 150 | 5.5 | 2.1 |
| Comp. 5 | 20 | — | — | 1537 | 627 | 27.5 | 3.3 |
| Comp. 6 | 5 | — | — | 1458 | 345 | 23.0 | 1.1 |
| Comp. 7 | 50 | — | — | 1218 | 146 | 20.0 | 5.8 |

*1: Aqueous dispersion of polyurethane (SUPERFLEX 300, obtained by reaction of a polyester polyol and a polyether polyol with a diisocyanate, manufactured by Daiichi Kogyo Seiyaku K. K., solid content: 30% by weight)
*2: Forcedly-emulsified type polyurethane aqueous dispersion (SUPERFLEX E2000 manufactured by Daiichi Kogyo Seiyaku K. K., solid content: 25% by weight)
*3: Polyester-type polyurethane resin emulsion (YODOSOL GC52, manufactured by Kanebo NSC K. K., solid content: 50% by weight)
*4: Acrylate copolymer latex (NACRYLIC 125-4445, manufactured by Kanebo NSC K. K., solid content: 35% by weight)
*5: Polyvinyl alcohol

EXAMPLE 16

An aqueous dispersion containing 1% by weight of cellulose fibers was mixed with quantities of an aqueous solution containing 1% by weight of an acetic acid salt of chitosan and an aqueous dispersion of polyurethane (SUPERFLEX 300 manufactured by Daiichi Kogyo Seiyaku K. K., solid content: 30% by weight) to obtain a mixture having chitosan salt and polyurethane contents of 20 parts by weight and 100 parts by weight, respectively, per 100 parts by weight of the cellulose fibers. The mixture was spread over the surface of a glass plate and dried under a hot air stream at 70° C. to obtain a translucent film with a thickness of 80 μm. A 20% by weight solution of a poly-ε-caprolactone in ethyl acetate was then applied on the thus obtained substrate film by means of a bar coater and the coating was dried at 50° C. to obtain a composite film having a poly-ε-caprolactone layer with a thickness of 3 μm. The biodegradability test revealed that the composite film was completely decomposed. The composite film showed a seal strength of 1135 g/10 mm.

EXAMPLE 17

An aqueous dispersion containing 1% by weight of cellulose fibers was mixed with quantities of an aqueous solution containing 1% by weight of an acetic acid salt of chitosan and an aqueous dispersion of polyurethane (SUPERFLEX 300 manufactured by Daiichi Kogyo Seiyaku K. K., solid content: 30% by weight) to obtain a mixture having chitosan salt and polyurethane contents of 20 parts by weight and 50 parts by weight, respectively, per 100 parts by weight of the cellulose fibers. The mixture was spread over the surface of a glass plate and dried under a hot air stream at 70° C. to obtain a translucent film with a thickness of 80 $\mu$m. A 10% by weight solution of a polyurethane, obtained from a polyester polyol, in tetrahydrofran was then applied on the thus obtained substrate film by means of a bar coater and the coating was dried at 50° C. to obtain a composite film having a polyurethane layer with a thickness of 9 $\mu$m. The biodegradability test revealed that the composite film was completely decomposed. The composite film showed a seal strength of 907 g/10 mm.

EXAMPLE 18

Example 17 was repeated in the same manner as described except that the content of the polyurethane in the substrate film was increased to 150 parts by weight per 100 parts by weight of the cellulose fibers. The biodegradability test revealed that the composite film was almost completely decomposed. The composite film showed a seal strength of 1313 g/10 mm.

EXAMPLE 19

An aqueous dispersion containing 1% by weight of cellulose fibers was mixed with quantities of an aqueous solution containing 1% by weight of an acetic acid salt of chitosan, an aqueous solution of polyethylene oxide and glycerin to obtain a mixture having a chitosan salt content of 20 parts by weight, a polyethylene oxide content of 100 parts by weight and a glycerin content of 75 parts by weight per 100 parts by weight of the cellulose fibers. The mixture was spread over the surface of a glass plate and dried under a hot air stream at 70° C. to obtain a translucent film with a thickness of 80 $\mu$m. A 10% by weight aqueous solution of a polyethylene oxide was then applied on the thus obtained substrate film by means of a bar coater and the coating was dried at 50° C. to obtain a composite film having a polyethyleneoxide layer with a thickness of 15 $\mu$m. The biodegradability test revealed that the composite film was almost completely decomposed. The composite film showed a seal strength of 1220 g/10 mm.

EXAMPLE 20

Chitosan (1 part by weight) was mixed with 98 parts by weight of water and 1 part by weight of acetic acid to obtain an aqueous solution of chitosan acetate. This solution (28 parts by weight) was then mixed with 140 parts by weight of aqueous dispersion containing 1% by weight of fine cellulose fibers and 1.05 parts by weight of glycerin and the mixture was applied onto a glass plate and dried at 70° C., thereby obtaining a substrate film with a thickness of 70 $\mu$m. A 20% by weight solution of a poly-$\epsilon$-caprolactone in ethyl acetate was then applied on the thus obtained substrate film by means of a bar coater and the coating was dried at 50° C. to obtain a composite film having a poly-$\epsilon$-caprolactone layer with a thickness of 3 $\mu$m. The biodegradability test revealed that the composite film was completely decomposed. The composite film showed a seal strength of 33 g/10 mm.

EXAMPLE 21

Example 20 was repeated in the same manner as described except that the poly-$\epsilon$-caprolactone layer had a thickness of 9 $\mu$m. The biodegradability test revealed that the composite film was completely decomposed. The composite film showed a seal strength of 145 g/10 mm.

EXAMPLE 22

Example 20 was repeated in the same manner as described except that the poly-$\epsilon$-caprolactone layer had a thickness of 15 $\mu$m. The biodegradability test revealed that the composite film was completely decomposed. The composite film showed a seal strength of 303 g/10 mm.

EXAMPLE 23

A substrate film similar to that of Example 20 was applied with a 10% by weight solution of polyester-type polyurethane in tetrahydrofuran and the coating was dried at 50° C. for 5 minutes to form a polyurethane layer with a thickness of 9 $\mu$m on the substrate film. The biodegradability test revealed that the composite film was almost completely decomposed. The composite film showed a seal strength of 130 g/10 mm.

EXAMPLE 24

A substrate film similar to that of Example 20 was applied with a 10% by weight aqueous solution of polyethylene oxide and the coating was dried at 50° C. for 5 minutes to form a polyethylene oxide layer with a thickness of 9 $\mu$m on the substrate film. The biodegradability test revealed that the composite film was completely decomposed. The composite film showed a seal strength of 80 g/10 mm.

EXAMPLE 25

An aqueous dispersion containing 1% by weight of cellulose fibers was mixed with a quantity of an aqueous solution containing 1% by weight of an acetic acid salt of chitosan to obtain a mixture having a chitosan salt content of 20 parts by weight per 100 parts by weight of the cellulose fibers. The mixture was spread over the surface of a glass plate and dried under a hot air stream at 70° C. to obtain a translucent film with a thickness of 80 $\mu$m. A 20% by weight solution of a poly-$\epsilon$-caprolactone in ethyl acetate was then applied on the thus obtained substrate film by means of a bar coater and the coating was dried at 50° C. to obtain a composite film having a poly-$\epsilon$-caprolactone layer with a thickness of 3 $\mu$m. The biodegradability test revealed that the composite film was completely decomposed. The composite film showed a seal strength of 39 g/10 mm.

EXAMPLE 26

A substrate film similar to that of Example 25 was applied with a 10% by weight solution of polyester-type polyurethane in tetrahydrofuran and the coating was dried at 50° C. for 5 minutes to form a polyurethane layer with a thickness of 9 $\mu$m on the substrate film. The bi-odegradability test revealed that the composite film was almost completely decomposed. The composite film showed a seal strength of 158 g/10 mm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A biodegradable composition consisting essentially of, in the form of an admixture, 100 parts by weight of cellulose fibers having a length of 3 mm or less and a diameter of 50 μm or less, 10-600 parts by weight of a thermoplastic resin and 2-100 parts by weight of chitosan, said composition produced by a process comprising:
   providing (a) an aqueous solution of chitosan and (b) an aqueous dispersion or solution of a thermoplastic resin;
   mixing said cellulose fibers with said aqueous solution (a) and said aqueous dispersion or solution (b) to form a mixture; and
   drying said mixture to form said composition.

2. A composition as set forth in claim 1, wherein said thermoplastic resin is biodegradable.

3. A composition as set forth in claim 2, wherein said thermoplastic resin is at least one member selected from the group consisting of polyvinyl alcohols, polyurethanes obtained by reaction of a polyester polyol with a diisocyanate, polyurethanes obtained by reaction of a polyester polyol and a polyether polyol with a diisocyanate, polyethylene oxides and aliphatic polyesters.

4. A composition as set forth in claim 1, wherein said thermoplastic resin is substantially insoluble in water.

5. A composition as set forth in claim 4, wherein said thermoplastic resin is at least one member selected from the group consisting of polyurethanes, polyacrylates, polyvinyl acetates, polyamides and polyesters.

6. A composition as set forth in claim 4, wherein said thermoplastic resin is biodegradable.

7. A composition as set forth in claim 6, wherein said thermoplastic resin is at least one member selected from the group consisting of polyurethanes obtained by reaction of a polyester polyol with a diisocyanate and polyurethanes obtained by reaction of a polyester polyol and a polyether polyol with a diisocyanate.

8. A shaped article formed from the composition according to claim 1.

9. A shaped article as set forth in claim 8, comprising a substrate film formed of said composition and a layer provided at least one side of said substrate film and formed of a biodegradable material.

10. A shaped article as set forth in claim 9, wherein said thermoplastic resin is biodegradable.

11. A shaped article as set forth in claim 10, wherein said thermoplastic resin is at least one member selected from the group consisting of polyvinyl alcohols, polyurethanes obtained by reaction of a polyester polyol with a diisocyanate, polyurethanes obtained by reaction of a polyester polyol and a polyether polyol with a diisocyanate, polyethylene oxides and aliphatic polyesters.

12. A shaped article as set forth in claim 9, wherein said biodegradable material is at least one member selected from the group consisting of polyvinyl alcohols, polyurethanes obtained by reaction of a polyester polyol with a diisocyanate, polyurethanes obtained by reaction of a polyester polyol and a polyether polyol with a diisocyanate, polyethylene oxides and aliphatic polyesters.

13. A composite film comprising a substrate film formed of a biodegradable composition consisting essentially of, in admixture, 100 parts by weight of cellulose fibers having a length of 3 mm or less and a diameter of 50 μm or less, 10-600 parts by weight of a thermoplastic resin and 2-100 parts by weight of chitosan, and a layer provided on at least one side of said substrate film and formed of a biodegradable material.

14. A composite film as set forth in claim 13, wherein said biodegradable material is at least one member selected from the group consisting of polyvinyl alcohols, polyurethanes obtained by reaction of a polyester polyol with a diisocyanate, polyurethanes obtained by reaction of a polyester polyol and a polyether polyol with a diisocyanate, polyethylene oxides and aliphatic polyesters.

* * * * *